United States Patent
Unal et al.

(10) Patent No.: US 12,508,136 B2
(45) Date of Patent: Dec. 30, 2025

(54) TRANSFEMORAL PROSTHESIS FOR WALKING, SITTING- STANDING, STAIR CLIMBING

(71) Applicant: OZYEGIN UNIVERSITESI, Istanbul (TR)

(72) Inventors: Ramazan Unal, Istanbul (TR); Ege Gediksiz, Kocaeli (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 596 days.

(21) Appl. No.: 17/924,123

(22) PCT Filed: Dec. 30, 2021

(86) PCT No.: PCT/TR2021/051620
§ 371 (c)(1),
(2) Date: Nov. 9, 2022

(87) PCT Pub. No.: WO2022/146397
PCT Pub. Date: Jul. 7, 2022

(65) Prior Publication Data
US 2023/0225884 A1   Jul. 20, 2023

(30) Foreign Application Priority Data

Dec. 30, 2020   (TR) ................. 2020/22508

(51) Int. Cl.
*A61F 2/64* (2006.01)
*A61F 2/60* (2006.01)
(Continued)

(52) U.S. Cl.
CPC ............. *A61F 2/64* (2013.01); *A61F 2/6607* (2013.01); *A61F 2002/607* (2013.01); *A61F 2002/6836* (2013.01); *A61F 2002/701* (2013.01)

(58) Field of Classification Search
CPC ..................................................... A61F 2/64
See application file for complete search history.

(56) References Cited

U.S. PATENT DOCUMENTS 5,746,773 A * 5/1998 Littig .................. A61F 2/76
623/46
2004/0064195 A1* 4/2004 Herr .................. A61F 2/66
623/44
(Continued)

FOREIGN PATENT DOCUMENTS

DE   102009004950 A1 * 7/2010 ............... A61F 2/64
DE   102018117377 B3 * 9/2019 ............... A61F 2/64
(Continued)

OTHER PUBLICATIONS

Louis Flynn, et al., The Challenges and Achievements of Experimental Implementation of an Active Transfemoral Prosthesis Based on Biological Quasi-Stiffness: The CYBERLEGs Beta-Prosthesis, Frontiers in Neurorobotics, 2018, pp. 1-20, vol. 12, Article 80.

*Primary Examiner* — Jacqueline Woznicki
(74) *Attorney, Agent, or Firm* — Bayramoglu Law Offices LLC

(57) ABSTRACT

A prosthesis or orthosis device includes a knee joint connectable with the user's leg; a swing storage spring-gear mechanism comprising a balancing spring inserted in an ankle member housing located in an ankle member, a drive gear, a driven gear, an intermediate gear and a gear rod, and a foot part comprising a dorsiflexion spring; a lower leg connecting a knee joint and a foot part to each other, in which a weight-receiving member is located; and a swing storage mechanism connected to the foot part by a second housing of the connection tube and a gear rod pin, and to the knee joint by a first housing of the connection tube and a first housing of the knee joint; and a weight-receiving mechanism comprising a weight-receiving member and a com- (Continued)

pression arm and a lock fork for activating and deactivating the weight-receiving member.

19 Claims, 21 Drawing Sheets

(51) Int. Cl.
   *A61F 2/66*   (2006.01)
   *A61F 2/68*   (2006.01)
   *A61F 2/70*   (2006.01)

(56) References Cited

U.S. PATENT DOCUMENTS

| | | | |
|---|---|---|---|
| 2006/0235544 A1* | 10/2006 | Iversen | A61F 2/70 623/47 |
| 2009/0030530 A1* | 1/2009 | Martin | A61B 5/4851 623/53 |
| 2013/0310949 A1 | 11/2013 | Goldfarb et al. | |
| 2015/0257902 A1* | 9/2015 | Martin | A61F 2/6607 623/47 |
| 2016/0278947 A1* | 9/2016 | Martin | A61F 2/70 |

FOREIGN PATENT DOCUMENTS

| | | | |
|---|---|---|---|
| EP | 2913031 A1 | 9/2015 | |
| WO | 2012177125 A1 | 12/2012 | |
| WO | WO-2013088142 A1 * | 6/2013 | A61F 2/70 |
| WO | 2013157965 A1 | 10/2013 | |
| WO | WO-2014016424 A1 * | 1/2014 | A61F 2/6607 |

* cited by examiner

TRANSFEMORAL PROSTHESIS FOR WALKING, SITTING- STANDING, STAIR CLIMBING

CROSS REFERENCE TO THE RELATED APPLICATIONS

This application is the national phase entry of International Application No. PCT/TR2021/051620, filed on Dec. 30, 2021, which is based upon and claims priority to Turkish Patent Application No. 2020/22508, filed on Dec. 30, 2020, the entire contents of which are incorporated herein by reference.

TECHNICAL FIELD

The invention relates to a transfemoral prosthetic device or orthosis.

BACKGROUND

The design of transfemoral prosthetic devices is of great interest in current research projects due to the vital impact of availability for amputees. However, in these devices, it is very difficult to provide sufficient mobility by using energy in an efficient manner. In order to preserve metabolic energy and to efficiently simulate the energy in a person's natural gait cycle, energy must be able to be stored, and released, in the ankle and knee.

The natural gait cycle involves movement of the thigh, calf, ankle, and foot to allow a person to walk. It is essential for designing a transfemoral prosthesis device to understand the movement of these body parts and their kinematic relations with each other during the natural gait cycle.

Knee prosthesis devices that are currently on the market can be classified as passive, microprocessor-controlled or motorized devices. Due to the fact that those in the passive group are developed in accordance with the kinematics of walking and have fixed characteristics, they are not suitable for changing environmental conditions, walking speed and movements. But they are cheap, lightweight, compact and aesthetically pleasing. Some of these passive prosthetic devices employ specific kinematic configurations to move different parts of the lower limb prosthetic device. Said devices are developed to use some dynamics of walking so as to render them functional.

However, individuals with amputations consume approximately 65% more metabolic energy as they cannot fulfill the energy efficiency provided by the muscles and tendons of a biological leg, since there is no energy storage and inter-articular conversion in the existing designs.

Microprocessor-controlled prosthetic devices are used to provide a prosthetic device that simulates natural gait cycle. Such microprocessor-controlled devices are intrinsically passive, using internal actuators to adapt to changing environment and walking speed, and a microprocessor to sense and control these actuators. Thus, human gait is imitated and the compatibility of the controlled prosthetic device is improved compared to the passive prostheses. However, the need for motor and battery increases the weight, and also they are quite expensive compared to passive ones. In addition, the control of these devices also implies some challenges.

Passive and microprocessor-controlled prostheses increase metabolic energy consumption as they do not provide net power to the joint and are not suitable for movements other than walking. In active prosthetic devices used to solve this problem, it is intended to facilitate climbing the stairs by giving net (positive) power to the knee joint of the prosthetic device during the gait cycle. This type of prosthetic device can also reduce the consumption of extra metabolic energy by changing the actual muscle activity to bend and straighten the knees by controlling the motorized parts to simulate the natural gait cycle. However, it is quite large, heavy and very expensive due to the need for a large motor and battery.

Since these passive, microprocessor-controlled and motorized knee prosthesis devices available on the market do not have a connection with the foot joint, they do not offer energy conversion, which is very important in walking and other movements. For this reason, they cannot provide natural leg functions and moreover, the external energy required in cases where the amputee's own metabolic energy is not sufficient.

Recently, the design of transfemoral prosthetic devices incorporating such movements has been attempted to be improved using energy storage components in order to reduce power consumption of the transfemoral prosthetic device during a gait cycle, however, such improvements have failed to maximize the total energy generated from the natural gait cycle.

"The Challenges and Achievements of Experimental Implementation of an Active Transfemoral Prosthesis Based on Biological Quasi-Stiffness: The CYBERLEGs Beta-Prosthesis" describes an active transfemoral prosthesis to create an average ground gait in both the knee and ankle in the sagittal plane. However, there is a need to provide more efficient locking mechanisms to make better use of this prosthesis. In addition, it is stated that the users deviate from the natural gait cycle while using the prosthesis.

In the patent document No. US2013310949 describes an apparatus and method for controlling climbing and descending stairs for electrical lower limb devices. The system processes the data received from a real-time sensor and controls only the knee joint and foot joint of the prosthesis. However, these two joints are not sufficient to simulate the natural gait cycle.

In the patent document No. WO213157965 describes a prosthesis that drives the knee joint and ankle joint by means of an electric motor. However, the prosthesis is quite large and heavy with its motor and gear system.

Given the designs in the prior art, there is still a need for an improved prosthetic device that imitates the energetic behavior that occurs during a human gait cycle, having the functionality of an active or microprocessor-controlled prosthetic device and the simplicity of a passive transfemoral prosthetic device, maximizing the absorption, storage and release of the energy produced during different movements such as sitting-standing, stair climbing-descending and walking, which naturally adapts to different speeds, slopes and surfaces, and ensuring the necessary energy efficiency.

SUMMARY

Particular embodiments of the invention include a smart/microprocessor-controlled prosthesis that provides natural speed and metabolic energy consumption in walking, by means of a lightweight and compact product that acts like a passive prosthesis and is controlled by mini motors, and an active prosthesis that fully performs functions (such as stair climbing) of the biological leg.

Thus, the device according to the invention includes a foot part, a knee joint, and an ankle joint, wherein the upper leg of the user is connected to the lower leg through the knee joint, wherein the lower leg is connected to the foot part through the ankle joint. This transfemoral prosthesis can store and release energy in both joints, namely the ankle and knee. The knee joint stores energy during the swing phase and transfers it through a connector to the ankle joint during the push-off. The swing storage spring-gear mechanism moves this element during the push-off (ankle push-off, the phase between heel lift-off and toes lift-off) to release the stored energy in a natural manner. It uses a balancing spring to prevent the foot from hitting the ground again after the push is terminated. This provides safe ground clearance during swing and brings the foot to the starting position (an ankle joint of 0 degree) before the heel strike. After the heel strike, a weight-receiving spring in the knee joint stores and releases energy in the same joint to ensure safe descending and efficient ankle roll-over. This spring is disengaged during swing and activated by the heel strike. The same spring stores energy during sitting to provide energy-saving sit-to-stands and provides sit-to-stand support by returning it back when standing up. The same spring is also used to store energy in parallel with a motor during stair climbing in order to provide an energy efficient and lightweight solution to robotic prostheses. A moment arm of the weight-receiving spring is modified to increase and decrease the torque around the knee joint in accordance with different walking speeds.

The numerous advantages, features, and functions of the various embodiments herein will be readily apparent and better understood in the light of the following description and accompanying drawings. The following description is not intended to limit the scope of the transfemoral prosthesis assembly, but rather provides exemplary embodiments for ease of understanding.

Hereinafter, the present invention will be mainly described with reference to a prosthetic device. It should be understood, however, that the invention equally applies to an orthotic device with similar effects. An example of a device according to the present invention is a transfemoral prosthetic device that simulates an energy-efficient absorption and release of a natural knee joint and ankle joint during the gait cycle.

BRIEF DESCRIPTION OF THE DRAWINGS

An embodiment of the present invention is illustrated by way of example in the accompanying drawings for better understanding thereof, and their use will be more readily apparent in view of the detailed description where reference numerals denote same or similar items, and the following drawings, wherein.

THE ELEMENTS SHOWN IN THE FIGURES ARE DENOTED THE FOLLOWING NUMBERS

Figure 10:
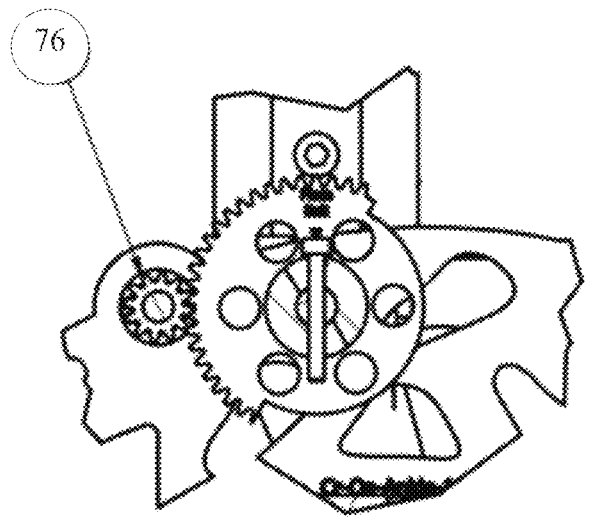
FIG. 10 is a view of two of the gears of the swing storage spring-gear mechanism of the prosthesis in an embodiment of the present invention.

1 Swing storage mechanism
2 Lower leg
  2.1 Lower leg housings
3 Weight-receiving mechanism
4 Knee joint
5 Foot part
6 Weight-receiving member
7 First housing of the connection tube
8 Upper tube
9 Spring cover
10 Swing storage spring
13 Guide screw
14 BLDC motor
15 Lower tube
16 Second housing of the connection tube
17 Left flange
  17.1 First housing of the knee joint
  17.2 Second housing of the knee joint
  17.3 Third housing of the knee joint
19 Potentiometer
22 Right flange
24.1-24.5 Shaft
26 Upper part of the knee
  26.1 Upper housings of the knee
30 Left compression arm
  30.1 Compression spring housing
  30.2 Housing of the weight-receiving spring
33 Support arm
34 Lock fork
  34.1 Lock fork housing
37 Right compression arm
40 Foot middle part
41 Right foot side
  41.1 Ankle member housing
42 Left foot side
44 Ankle member
46 Right heel spring holder
47 Left heel spring holder
48 Heel spring rod
49 Heel springs
50 Heel spring connector
51 Ankle shaft component
52 First member of the ankle lock
53 Second member of the ankle lock
54 Third member of the ankle lock
55 Fourth member of the ankle lock 56 Fifth member of the ankle lock
57 Dorsiflexion spring tube
60 Dorsiflexion spring
63 Drive gear
68 Gear rod pin
70 Gear rod
72 Driven gear
75 Inertial sensor
76 Intermediate gear
77 Balancing spring
79 Guide rail
80 Carrier
81 Motor
82 Piston rod
83 Toe tip housings
C Prosthetic or orthotic device
D Swing storage spring-gear mechanism
DA Posture adaptation mechanism
K Ankle lock mechanism In FIG. 10, A indicates the groove for a motion range of 25 degrees for the bolt in the drive gear. Not for rotating the drive gear during dorsiflexion.

Figure 11:
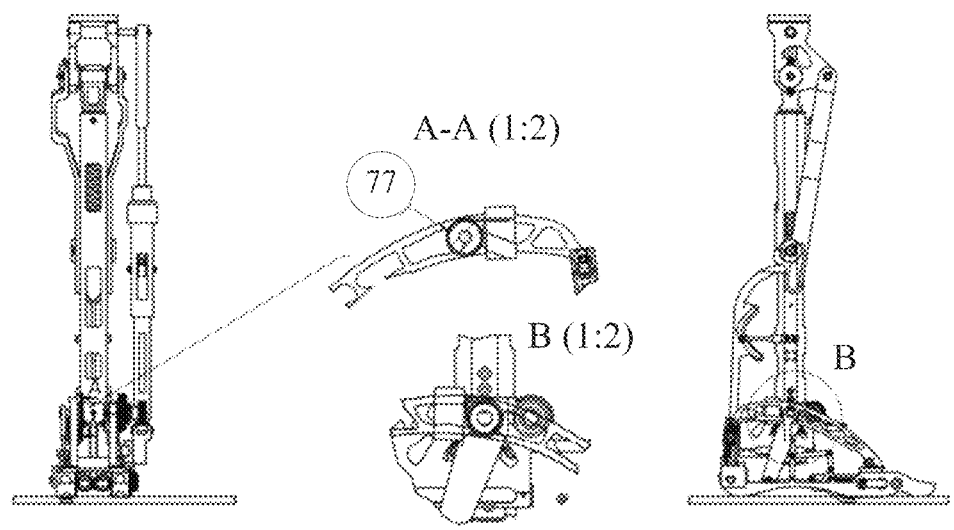
FIG. 11 is a view of a balancing spring provided in the foot part of the prosthesis in an embodiment of the present invention.

In FIG. 11, B indicates the surface determines the activation of the resetting spring based on the position of the ankle.

Figure 12A:
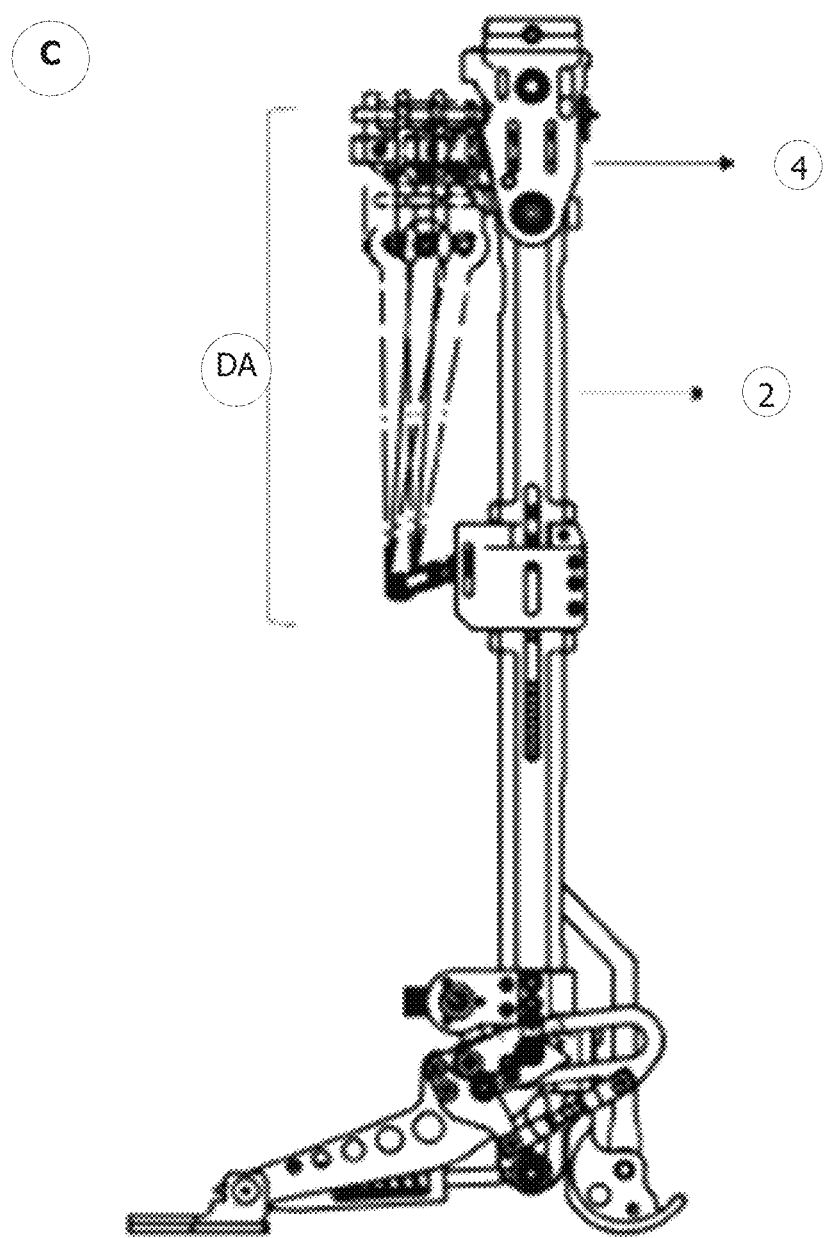
FIGS. 12A-C are views of a posture adaptation mechanism in an embodiment of the present invention.
Figure 12B:
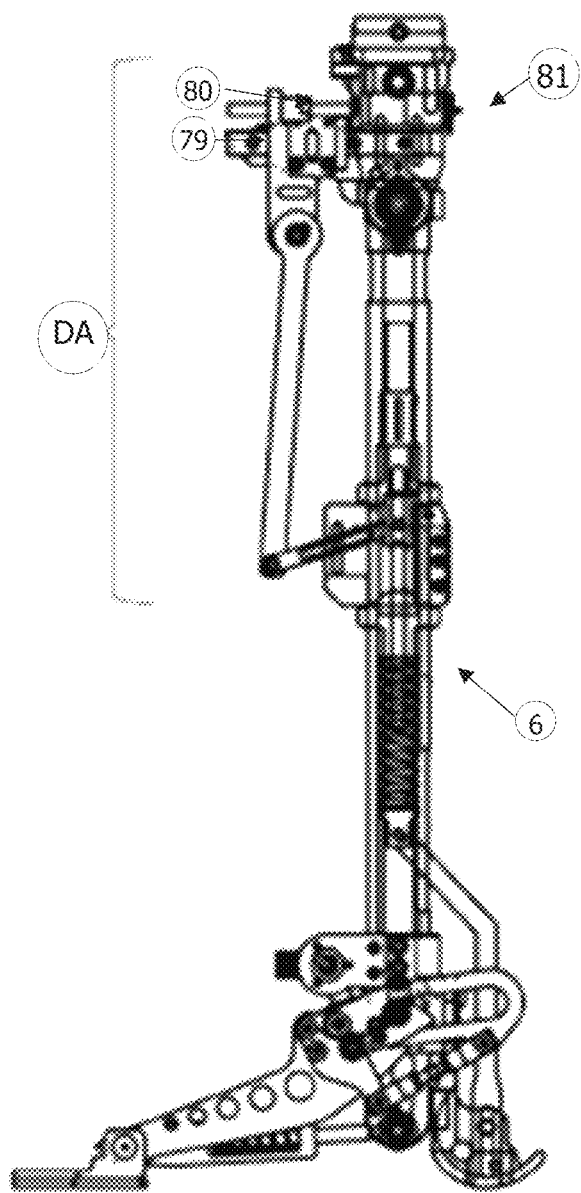
Figure 12C:
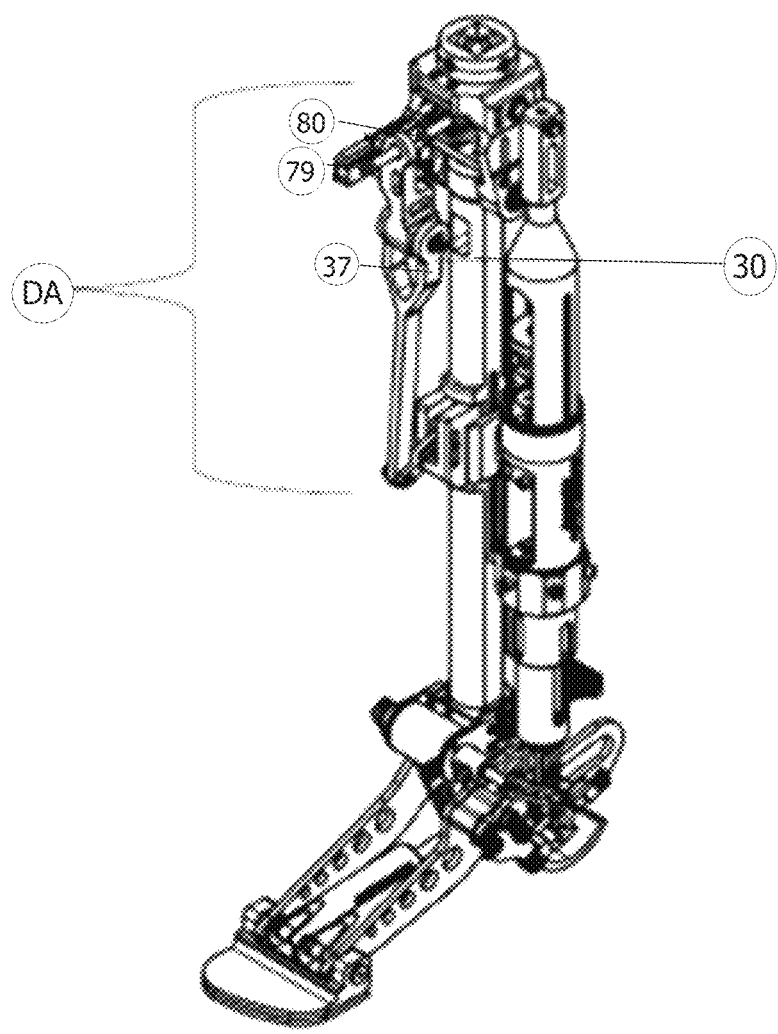
Figure 13:
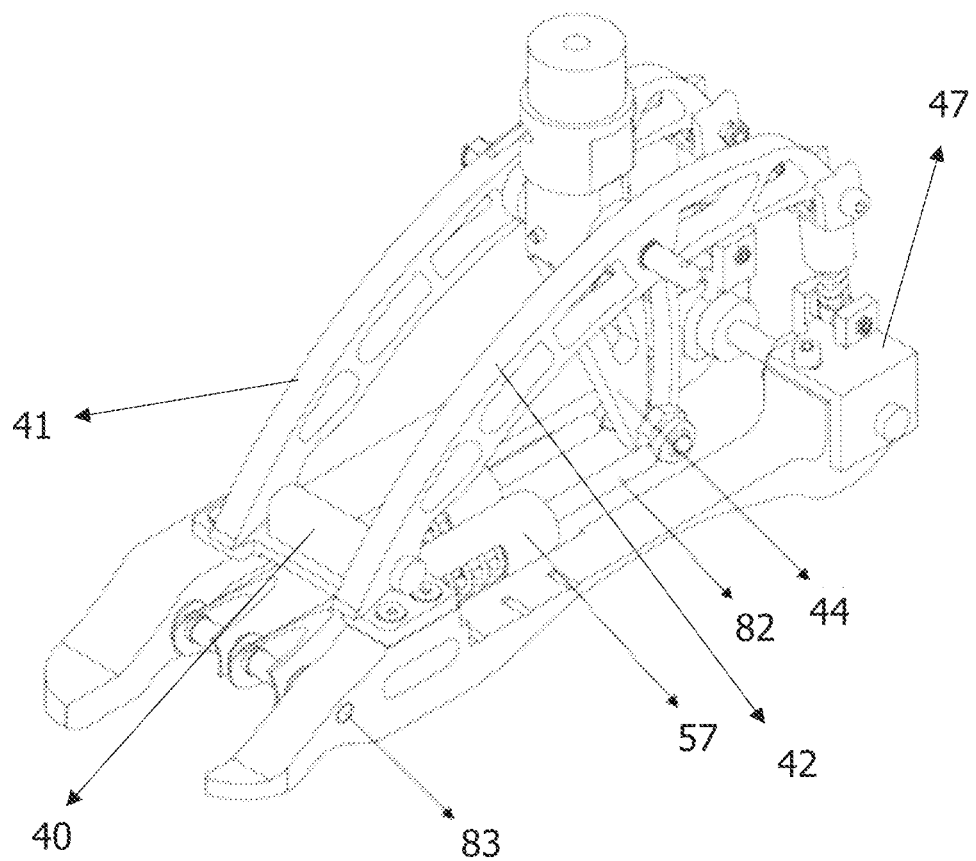
FIG. 13 is a view of the dorsiflexion energy storage mechanism, from another angle, in an embodiment of the present invention.

In FIGS. 12A-C, C indicates the moment arm is adjusted to the knee axis by screw-motor activation.

DETAILED DESCRIPTION OF THE EMBODIMENTS

An orthotic or prosthetic device is developed by imitating natural movements and energetic behavior of different body parts by analyzing the energetic and kinematic relationships that occur during different movements.

An ankle and knee have different energy absorption ranges during a natural human gait cycle. These energy absorption ranges around the ankle and knee can be used to imitate a natural gait cycle, optimizing the generation of energy required for a push-off.

A natural gait cycle consists of stance, front-swing, and swing phases, during which the knee joint (4) is mainly an energy absorber while the ankle joint is mainly an energy generator. In the stance phase, that is, between about 0% and about 45% of a stride, the knee absorbs energy during knee flexion and generates approximately same amount of energy for knee extension. Meanwhile, the ankle joint absorbs energy during dorsiflexion of the ankle, which is generated between about 10% and 45% of the stride. During the pre-swing phase, the knee absorbs about 50% to about 70% of the gait cycle. On the other hand, the ankle generates the majority of the energy required for push-off (approximately 80% of the total power generation during the entire gait cycle) between about 45% and 60% of the gait cycle. In the swing phase, the knee absorbs energy between about 80% and 95% of the gait cycle, while the power flow around the ankle is negligible. As a result, a natural gait power flow can be provided to a transfemoral prosthetic device based on the relationship of the absorption and energy generation around a person's knee and ankle joint.

The transfemoral prosthetic or orthotic device (C), formed using these kinetic relationships, comprises a swing storage mechanism (1), a lower leg (2), a weight-receiving mechanism (3), a knee joint (4), and a foot part (5) to imitate different energy absorption and generation intervals occurring around the knee and ankle joints during a natural gait cycle.

Figure 1:
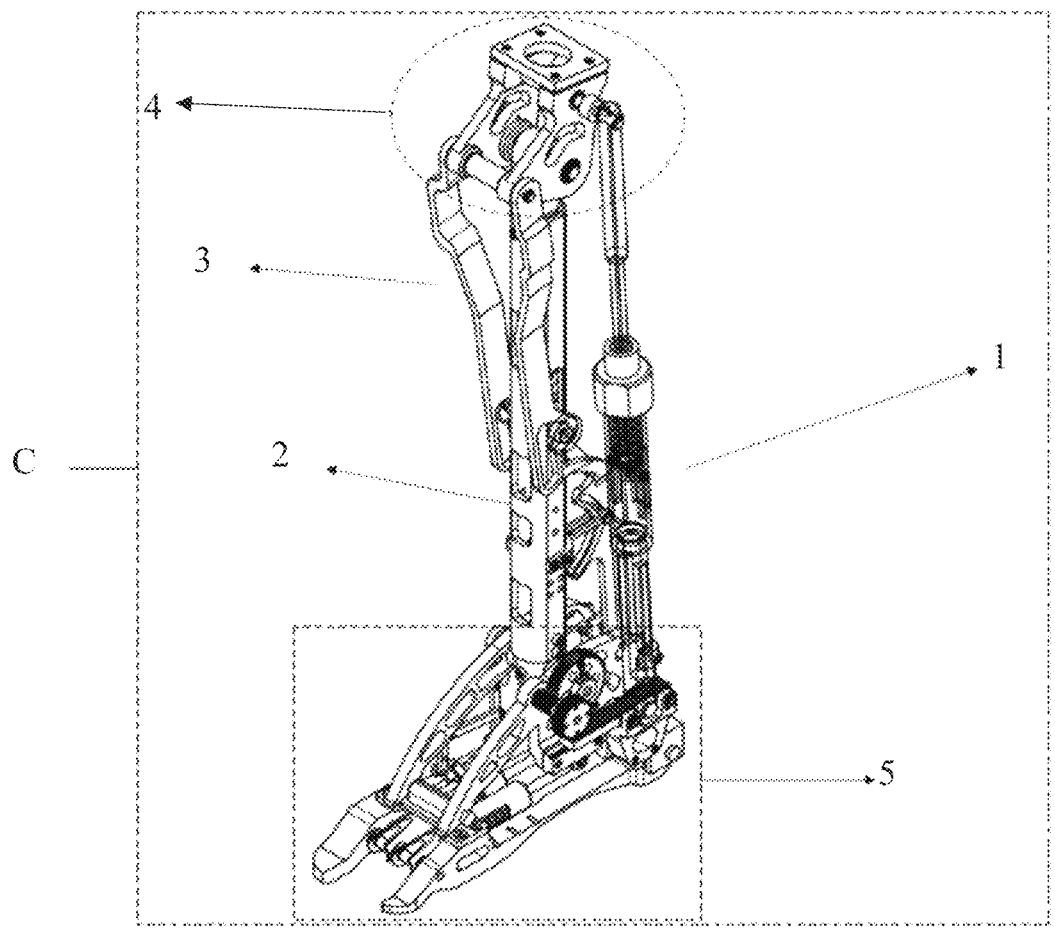
FIG. 1 is a view of a prosthesis in an embodiment of the present invention.
Figure 2A:
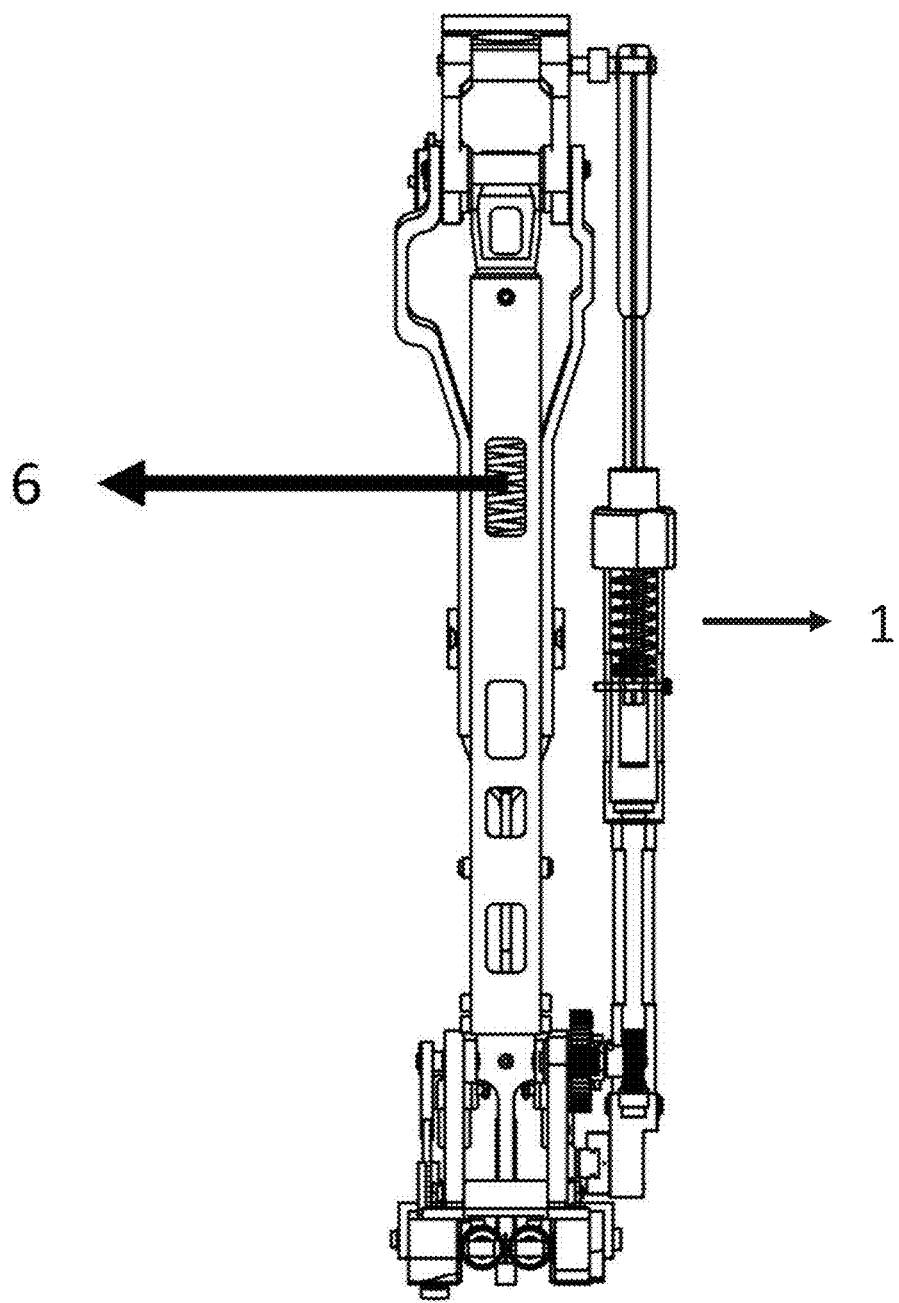
FIGS. 2A-C include views of the prosthesis from different angles, in an embodiment of the present invention.
Figure 2B:
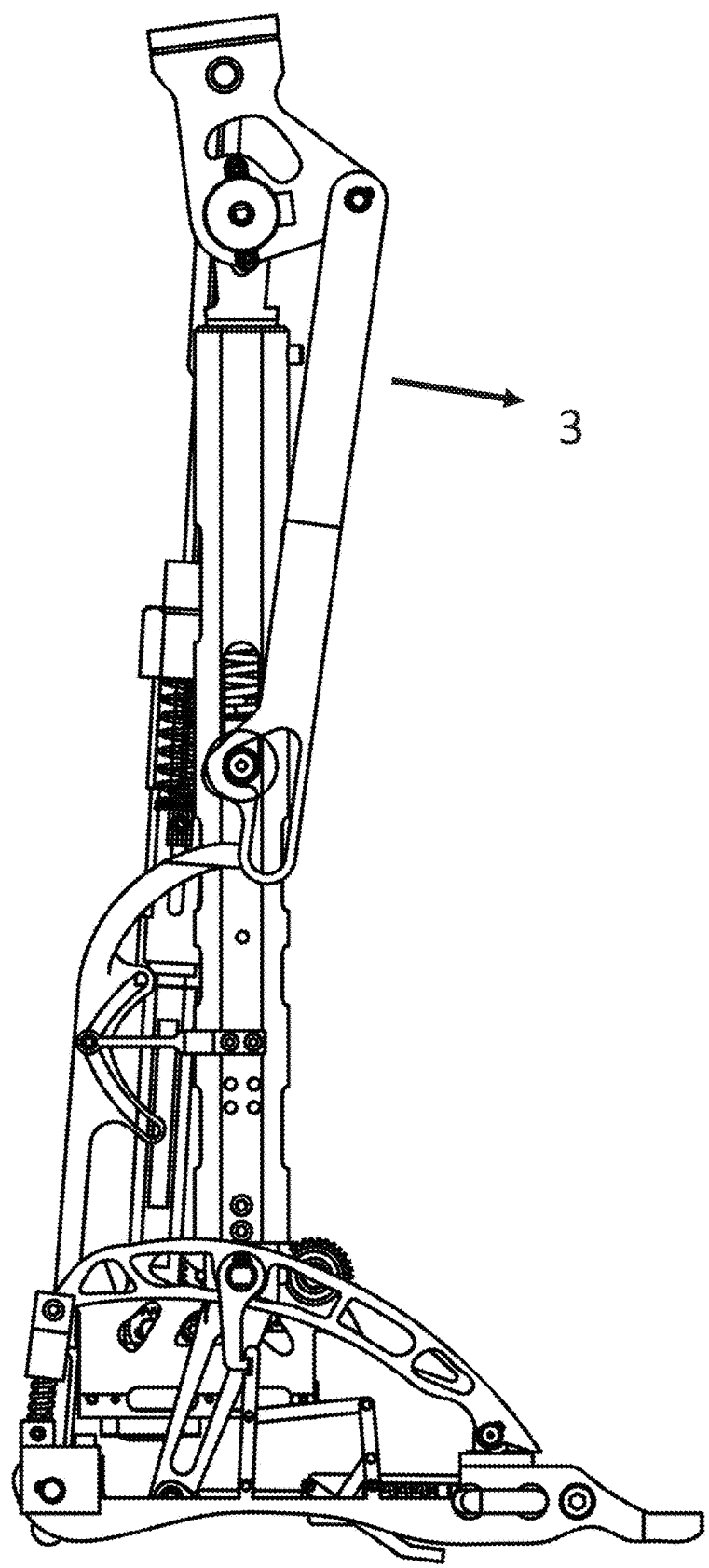
Figure 2C:
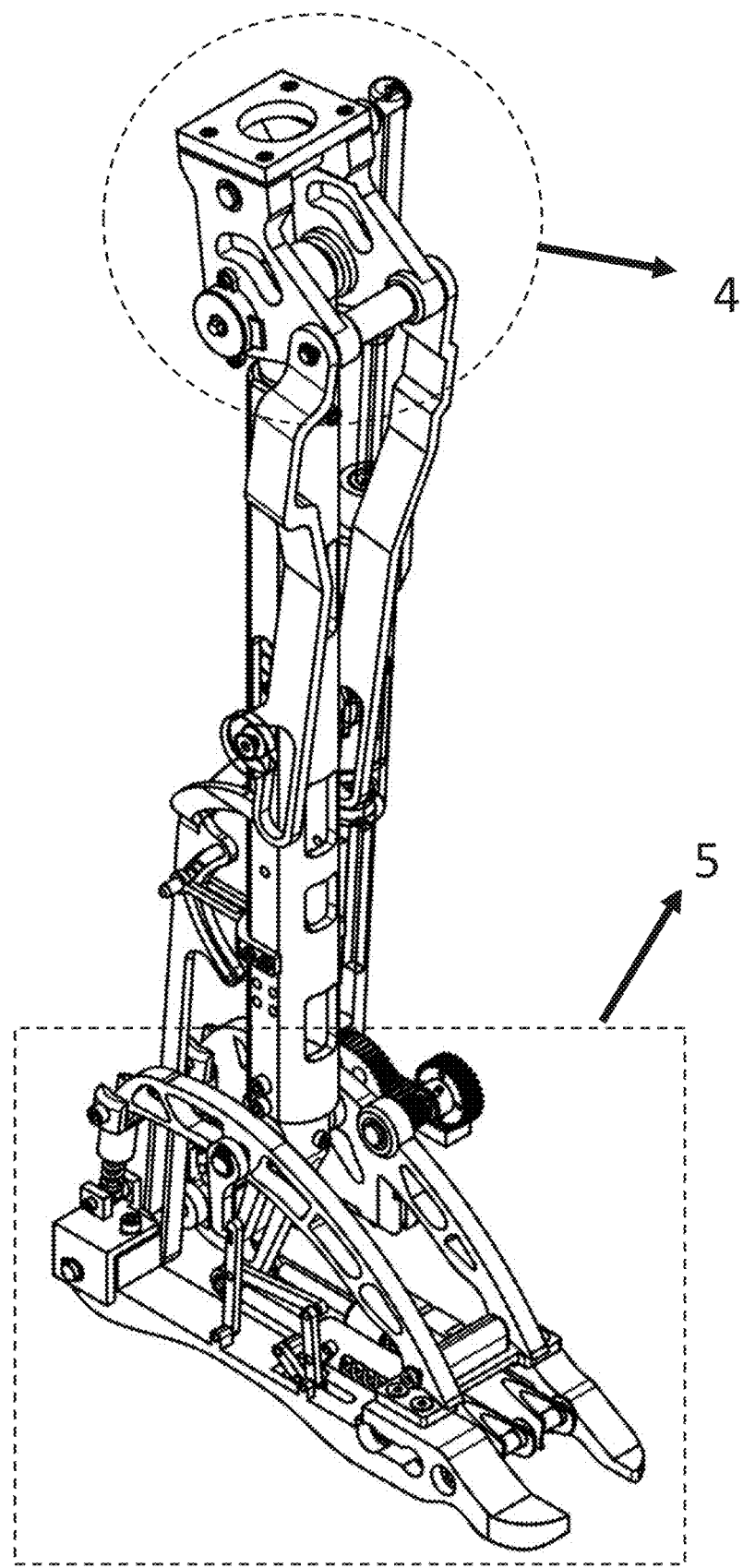
Figure 3:
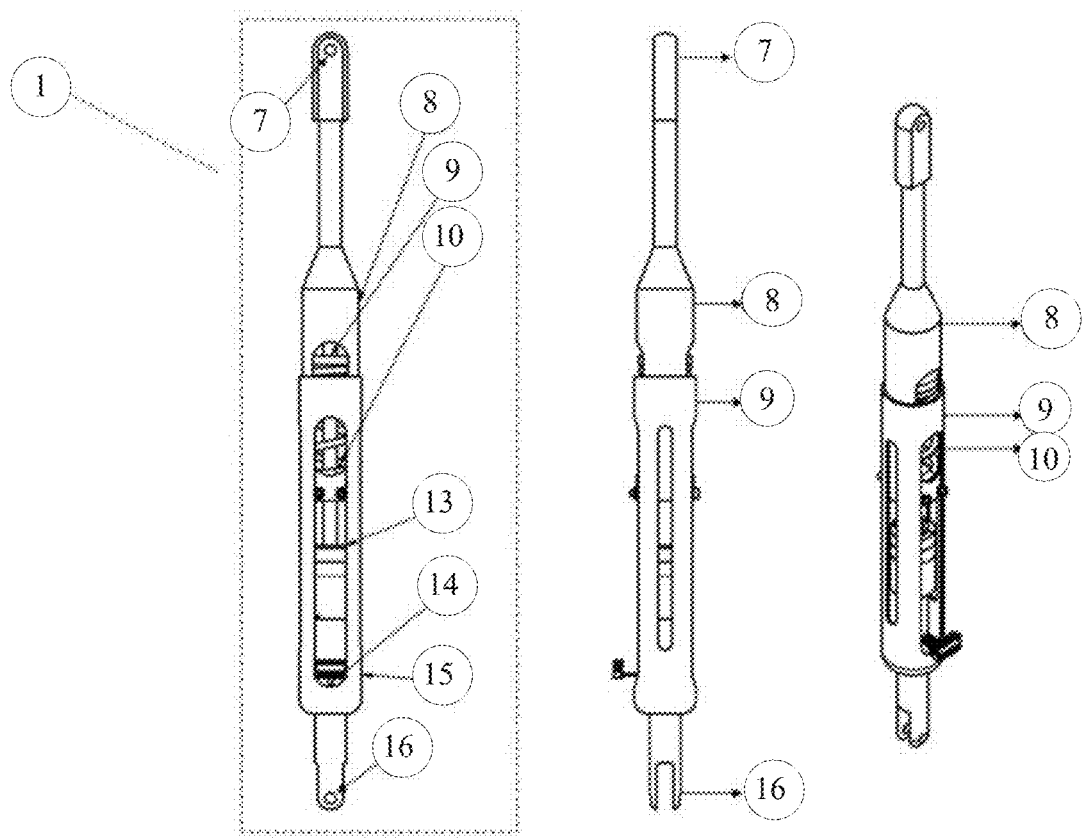
FIG. 3 includes views of a swing storage mechanism from different angles, in an embodiment of the present invention.
Figure 4A:
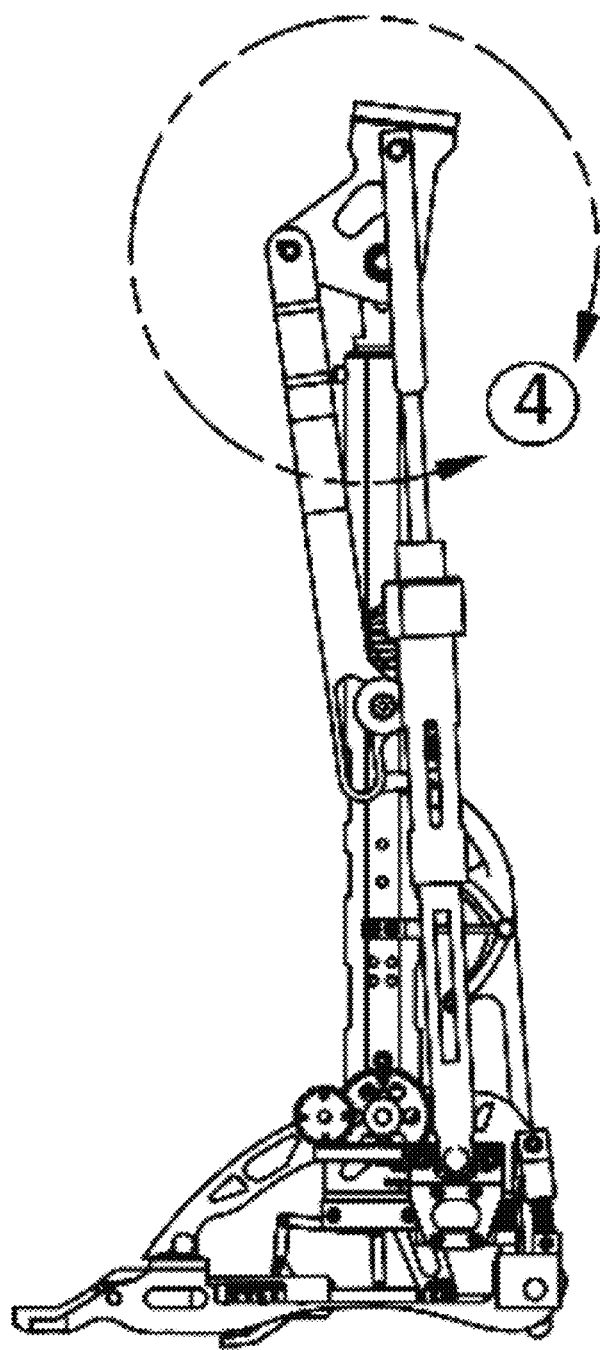
FIGS. 4A-D include views of a knee joint of the prosthesis from different angles, in an embodiment of the present invention.
Figure 4B:
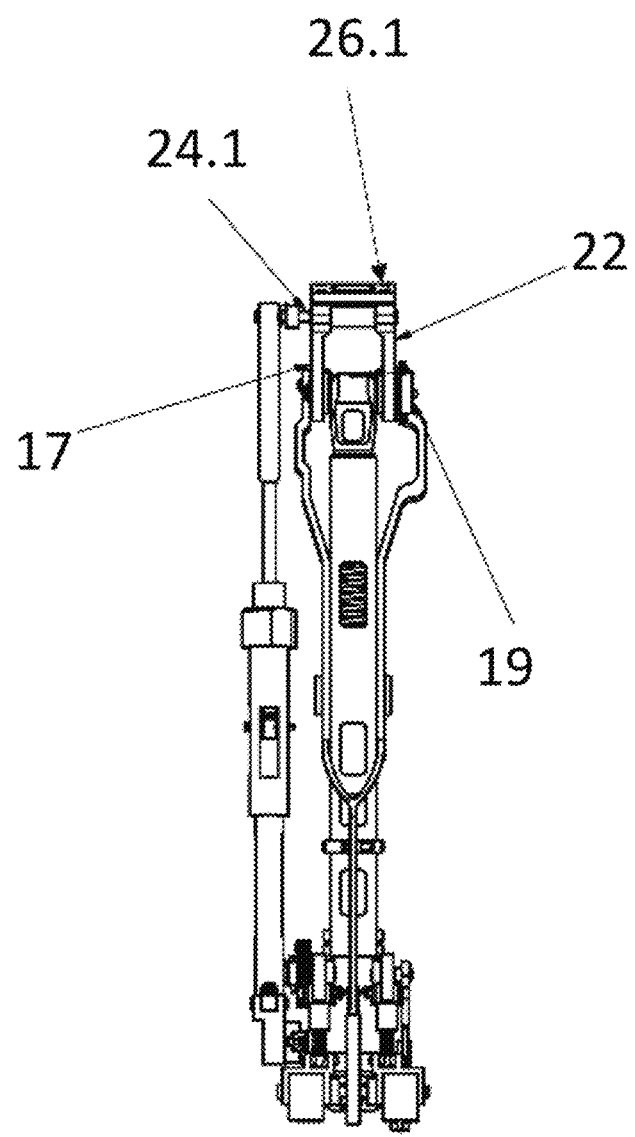
Figure 4C:
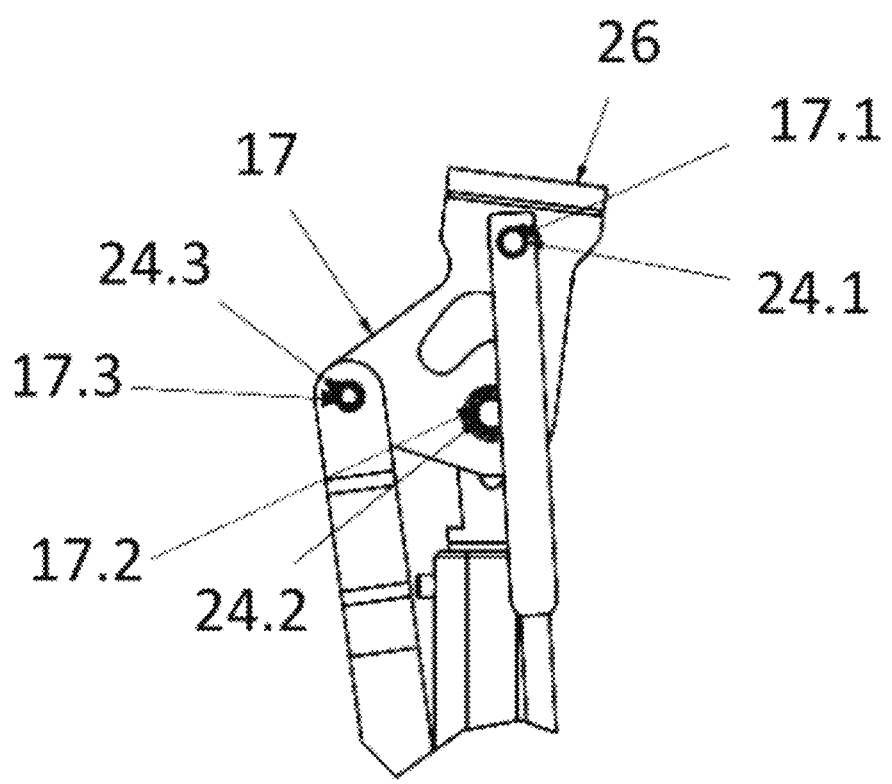
Figure 4D:
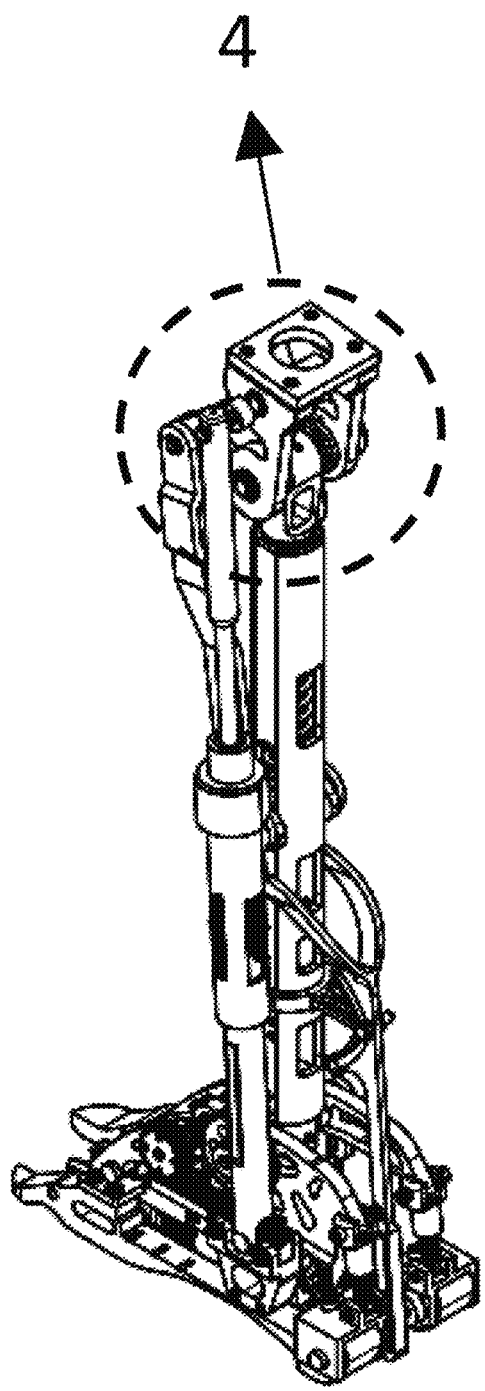
Figure 5A:
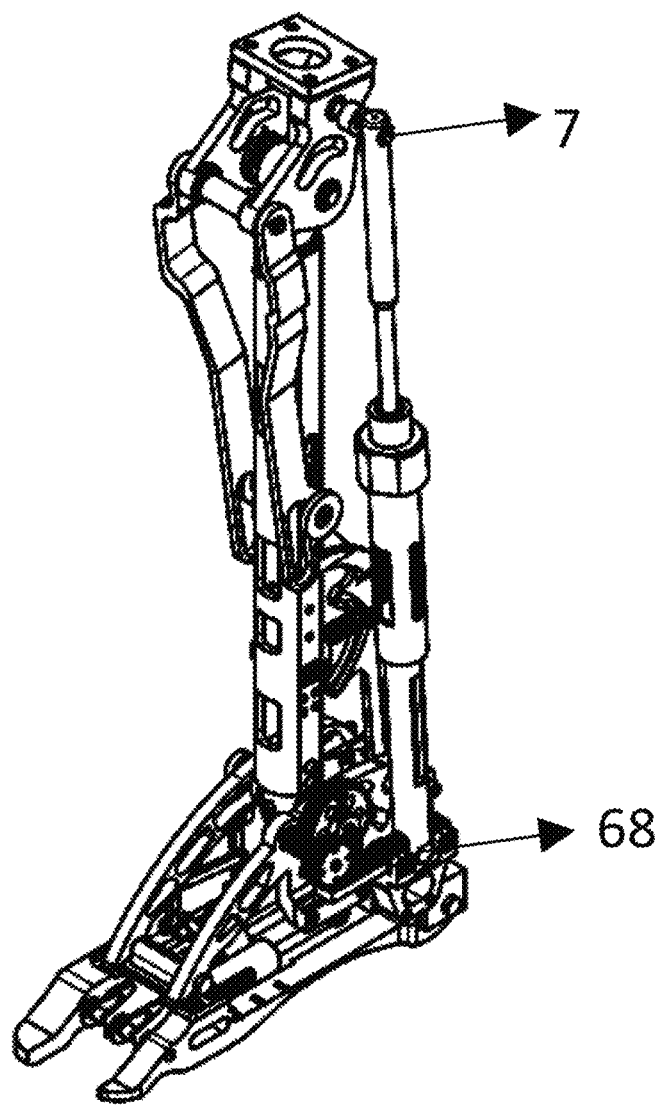
FIGS. 5A-C include views of a weight-receiving mechanism of the prosthesis from different angles, in an embodiment of the present invention.
Figure 5B:
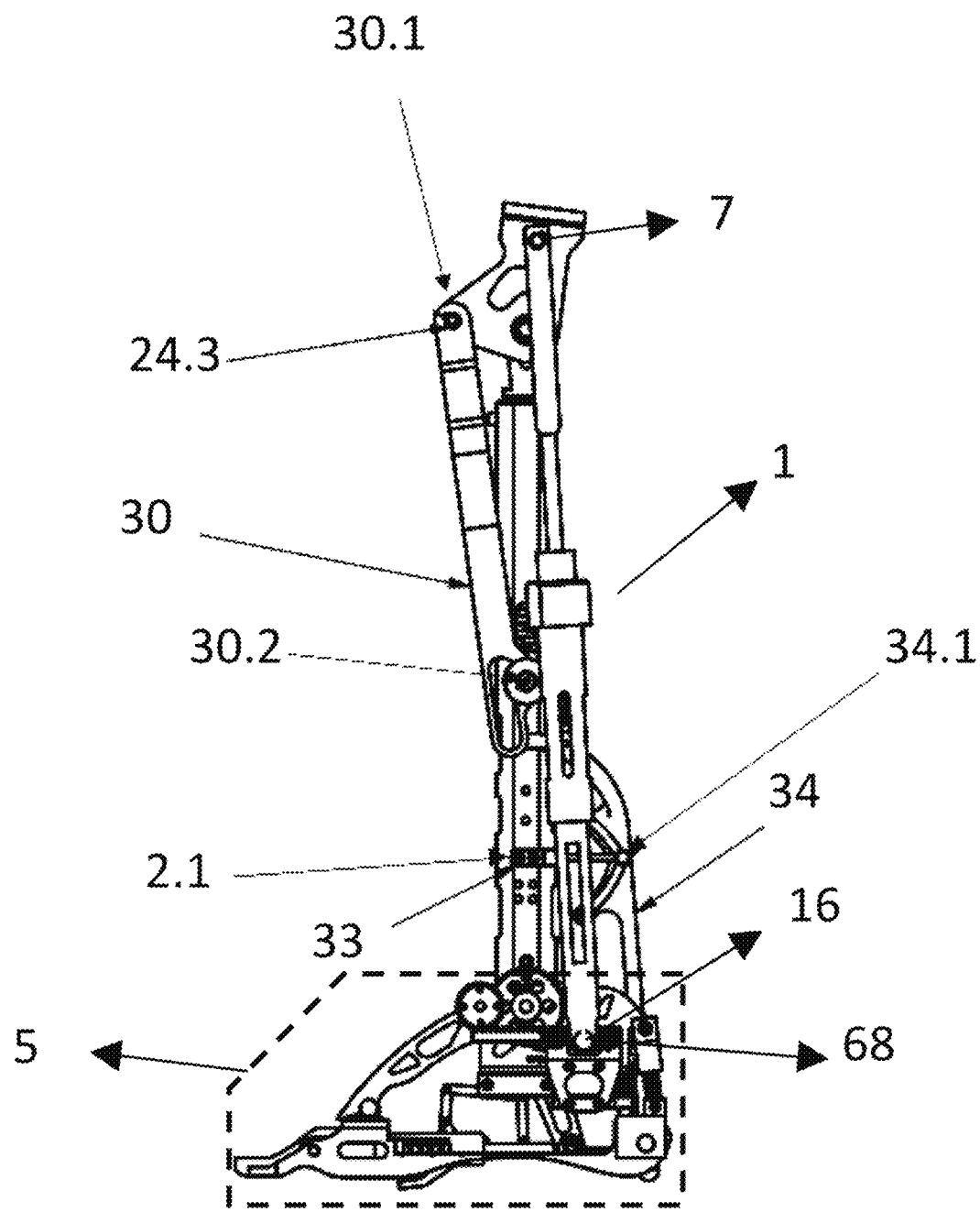
Figure 5C:
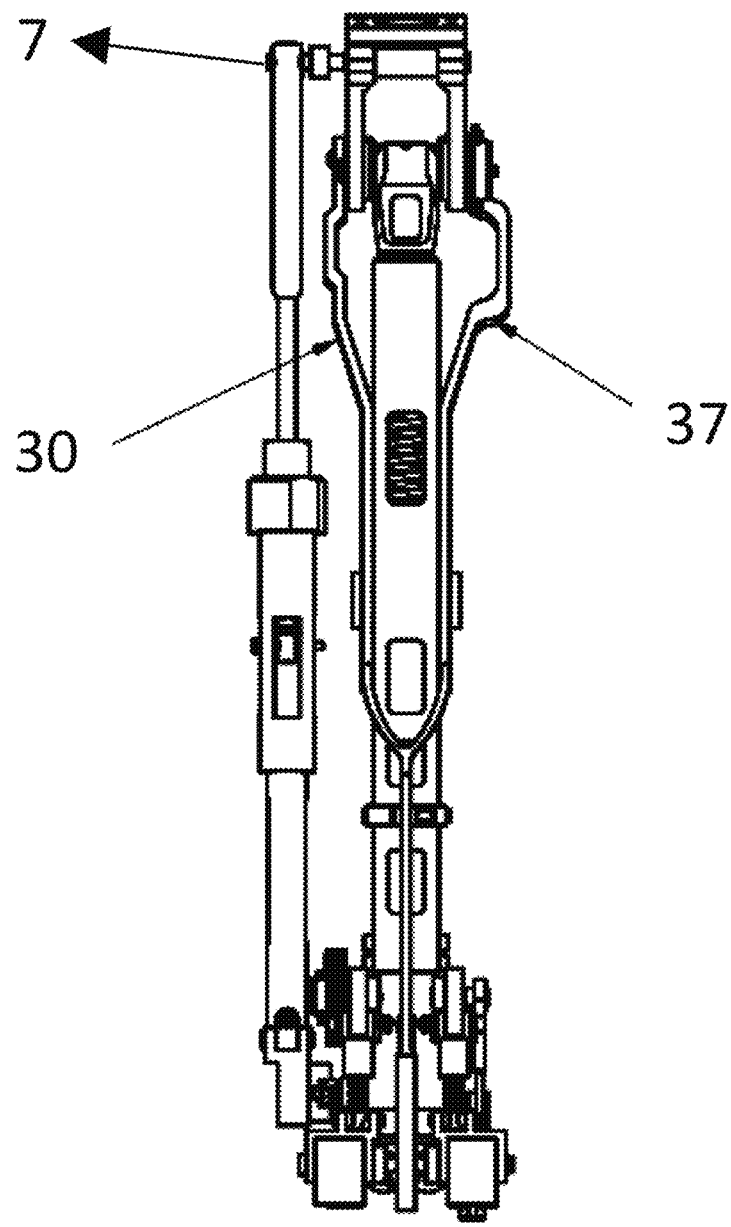
Figure 6:
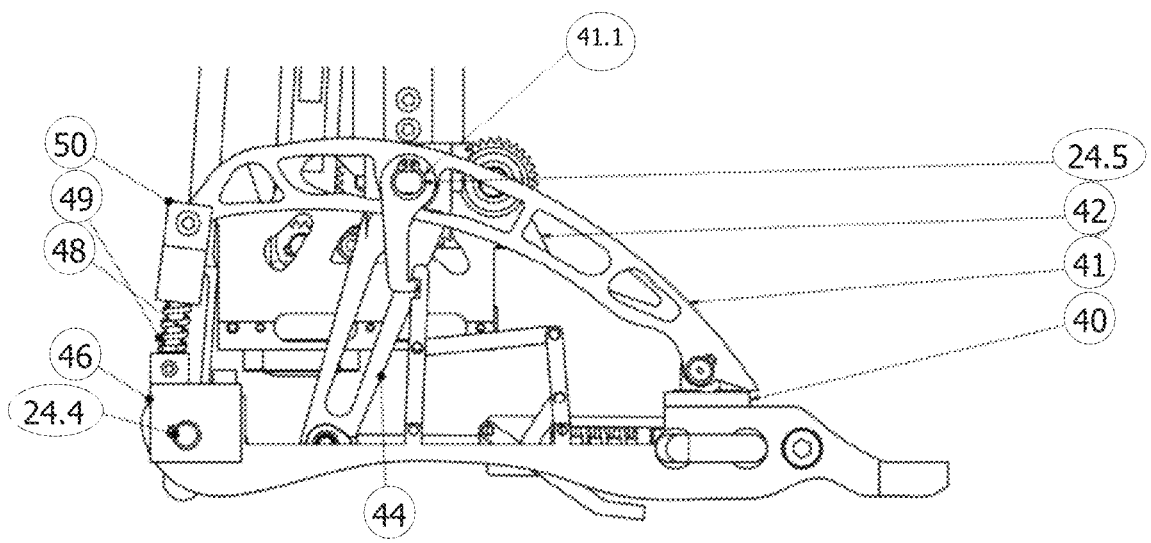
FIG. 6 is a side view of a foot part of the prosthesis in an embodiment of the present invention.
Figure 7:
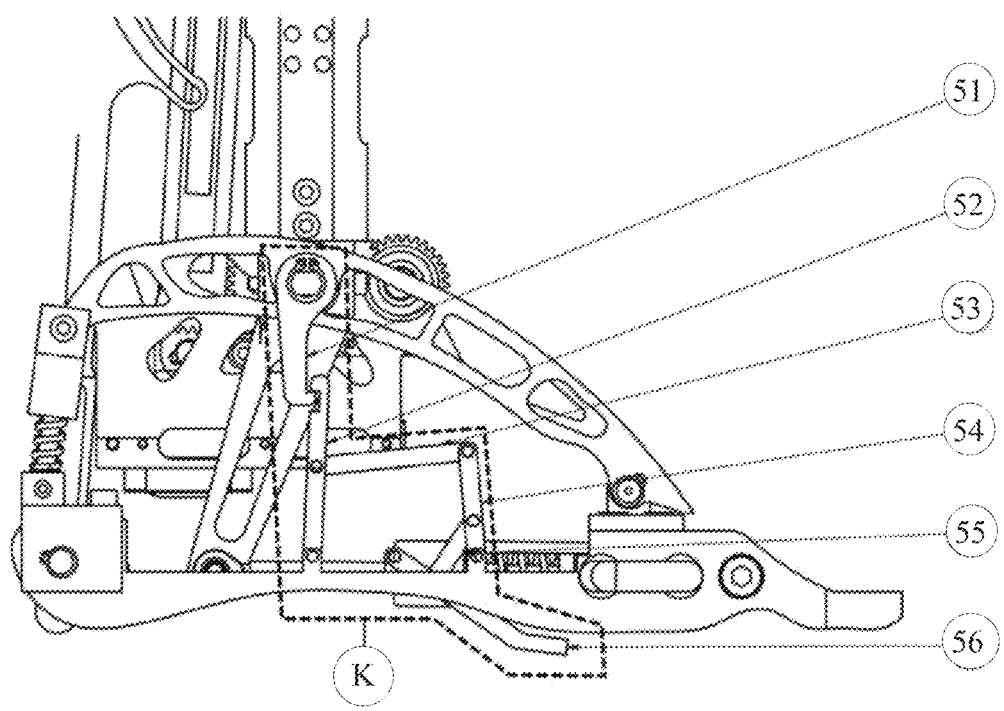
FIG. 7 is a view of an ankle lock mechanism of the prosthesis in an embodiment of the present invention.
Figure 8:
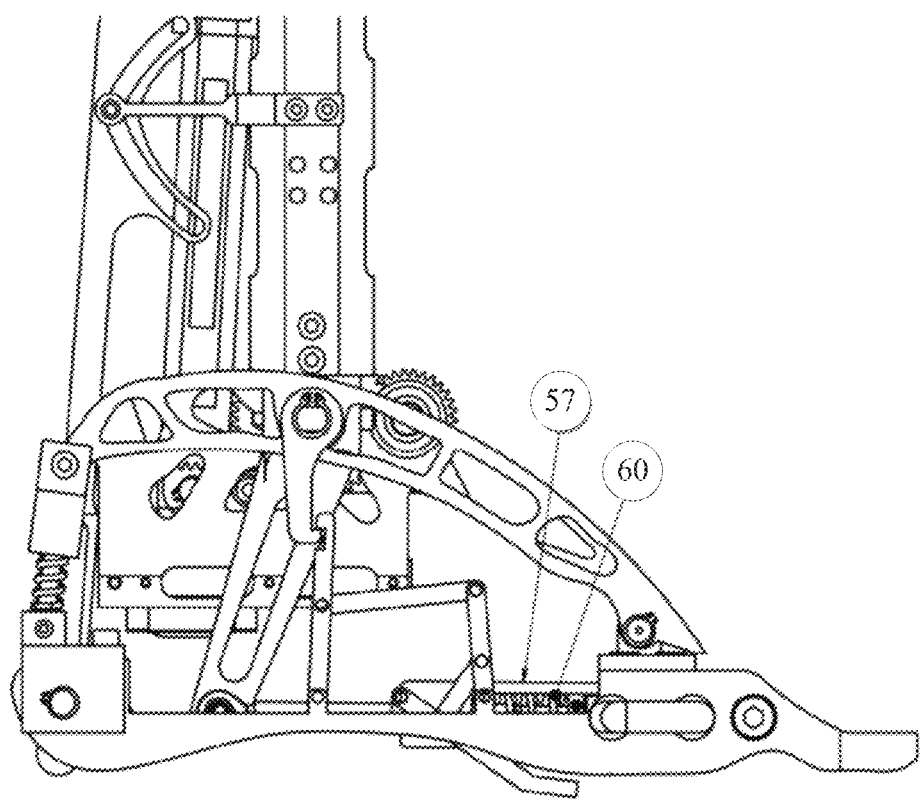
FIG. 8 is a view of a dorsiflexion energy storage mechanism provided in the foot part of the prosthesis in an embodiment of the present invention.
Figure 9:
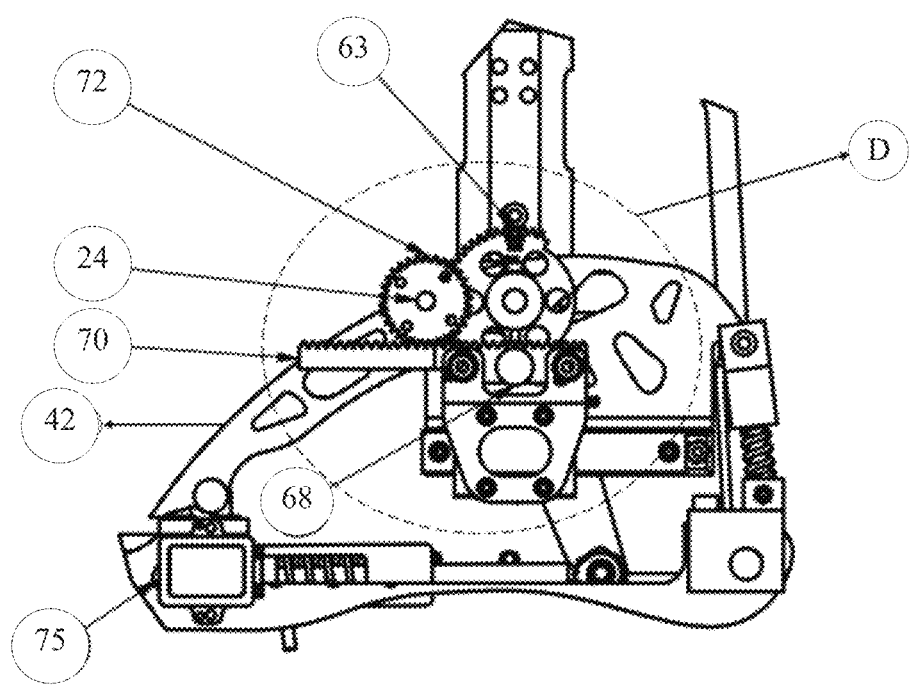
FIG. 9 is a view of a swing storage spring-gear mechanism of the prosthesis in an embodiment of the present invention.

The swing storage mechanism (1) connects the knee joint (4) to the foot part (5), simulating the energy absorption of the knee joint (4). It is responsible for the absorption of energy in the swing phase and its transfer to the foot part (5). Thus, it is made possible to use the energy stored in the knee, on the ankle. In an embodiment of the device, the swing storage mechanism (1) consists of a nested upper tube (8) and a lower tube (15). As can be seen in FIG. 5A-C, the swing storage mechanism (1) is connected to the foot part (5) at the second housing of the connection tube (16) by means of the gear rod pin (68). As for the knee joint (4), it is connected to the first housing of the knee joint (17.1) at the first housing of the connection tube (7) by means of a shaft (24). A spring cover (9) located in the nested upper tube (8) and the lower tube (15) moves with the guide screw (13) to change an activation position of the connection member swing storage spring (10).

The swing storage mechanism (1) also serves for the partial absorption of the energy in the ankle roll-over part of the stance phase of the gait cycle and for the transfer of this energy to the ankle part for push-off. The swing storage mechanism (1) may comprises another mechanical device or configuration capable of absorbing and releasing energy. Furthermore, the swing storage mechanism (1) may be attached to the knee joint (4) by fastening mechanisms known in the art, such as pins, screws, bolts or other mechanical means fixing the positioning of. The second housing of the connection tube (16) at the other end of the swing storage mechanism (1) is attached to a movable device such as a slider, bolt, pin, carriage, roller, or other slideable device. Thus, the swing storage mechanism (1) can be transported along a guided path in the foot part (5) between at least two positions. One skilled in the art will appreciate that said connection points (7, 16) can be reversed or repositioned.

In an embodiment of the device, the spring cover (9), the guide screw (13) and the BLDC motor (14) connection member form the adaptation mechanism within the swing storage mechanism (1). This mechanism changes the position of the swing storage spring (10) and activates the swing storage spring (10) at different times in accordance with different walking speeds and adjusts the swing angle of the knee. In this way, the position of the swing storage spring (10), and therefore the stored energy, is adapted to store the energy generated at different walking speeds. The swing adaptation mechanism may be used in another mechanical device or configuration that can change its position, such as a hydraulic or pneumatic cylinder, instead of the swing storage spring (10).

The lower leg (2) is connected to the ankle member (44) of the foot part (5) through the ankle member housing (41.1) by means of a shaft (24) located on the foot part (5). In an embodiment of the device, a weight-receiving member (6) is provided inside the lower leg (2) that ensures safe descending and effective ankle roll-over in the stance phase. The lower leg (2) may be made of an aluminum alloy, steel, carbon fiber, plastic or similar material having suitable strength and physical properties. In a basic embodiment of the invention, a spring is used as a weight-receiving member (6). Furthermore, in other embodiments of the invention, another mechanical device or configuration capable of absorbing and releasing energy may be used as the weight-receiving member (6).

The weight-receiving mechanism (3) is used to enable safe descending and effective ankle roll-over during the stance phase. In an embodiment of the device, the left compression arm (30) and the right compression arm (37)

are configured (hereinafter referred to as the compression arm (30, 37)) for the weight-receiving mechanism (3) to compress the weight-receiving member (6). The compression arm (30, 37) is connected to the knee joint (4) via the compression spring housing (30.1) and the third housing of the knee joint (17.3). This connection is performed by means of a shaft (24). The weight-receiving mechanism (3) is also connected to the weight-receiving member (6) through the housing of the weight-receiving spring (30.2). A lock fork (34) is provided herein, which is configured for activating and deactivating the weight-receiving mechanism (3). The lock fork (34) is connected to the lower leg (2) through the lock fork housing (34.1) via the lower leg housings (2.1) and the support arm (33). The weight-receiving mechanism (3), which is connected to the weight-receiving member (6) through the compression spring housing (30.1), is released when the foot is lifted off the ground and the compression arm (30, 37) does not press the weight-receiving member (6), thereby releasing the knee in the swing phase. Once the foot touches the ground, the compression arm (30, 37) sits on the weight-receiving member (6) and presses weight-receiving member (6). With the sit-to-stand support mechanism, the weight-receiving mechanism (3), which is configured to allow flexion of the knee during sitting, presses the weight-receiving member (6) to store energy, and returns it back while standing up, thereby providing sitting and standing support.

In another embodiment of the invention, with the sit-to-stand support mechanism, the weight-receiving mechanism (3), which is configured to allow 75°-170° flexion of the knee, more specifically 110° flexion while sitting, presses the weight-receiving member (6) and stores energy, and returns it back while standing up, thereby providing sitting and standing support.

In the present invention, the compression arm (30, 37) and the lock fork (34) may be made of an aluminum alloy, steel, carbon fiber, plastic, or similar material with appropriate strength and physical properties.

In another embodiment of the invention, another mechanical device or configuration capable of compressing and releasing the weight-receiving member (6) can be used instead of the weight-receiving mechanism (3).

The compression arm (30, 37) can be attached to the knee joint (4) with pins, screws, bolts, or it can be attached to the knee joint (4) by fastening mechanisms known in the art such as other mechanical means fixing the positioning of the compression arm (30, 37) through the compression spring housing (30.1). The lower end of the compression arm (30, 37) fully fits into the weight-receiving spring housing (30.2) and compresses the weight-receiving member (6), and comes out off the weight-receiving spring housing (30.2), thereby releasing the weight-receiving member (6).

According to the present invention, the lock fork (34) can be attached to the lower leg (2) by fastening mechanisms known in the art, such as pins, screws, bolts, or other mechanical means that fix the lock fork (34) to the lower leg (2) through the lower leg housings (2.1). Instead of the lock fork (34), another mechanical device or configuration capable of locking or releasing the compression arm (30, 37) may be used.

The user's upper leg is connected to the lower leg (2) of the device by means of the knee joint (4). In an embodiment of the device, the upper leg of the user is connected through the upper housings (26.1) of the device on the upper part (26) of the knee joint (4). The lower leg (2) is connected to the second housing (17.2) of the knee joint (4) by means of a shaft (24). The lower leg (2) is also pivotally connected to the knee joint (4) by means of a shaft (24). The left flange (17) and the right flange (22) secure the compression arm (30, 37) of the weight-receiving mechanism (3) to the third housing of the knee joint (17.3) by means of a shaft (24). The swing storage mechanism (1) is connected to the knee joint (4) via the first housing of the connection tube (7) and the first housing of the knee joint (17.1). It includes a potentiometer (19) to measure the angle of the knee joint (4).

In another embodiment of the invention, another mechanical device or configuration capable of connecting or releasing the user's upper leg to the lower leg (2) may be used.

In another embodiment of the invention, a posture adaptation mechanism (DA) is configured to increase or decrease the torque formed around the knee in accordance with the walking speed by changing the position of the compression arm (30, 37) during weight-receiving. The compression arm is adjusted in the knee axis by the movement of a carrier (80) on the guide rail (79) in accordance with the walking speed. The walking speed is determined by measuring the angle and angular velocity of the knee by a potentiometer (19), and accordingly, the motor (81) moves the carrier (80) on the guide rail (79) in order to provide the required torque around the knee. Thus, the pressing force of the compression arm on the weight-receiving member (6) can be changed.

The foot part (5) of the device according to the present invention comprises a foot middle part (40) forming the skeleton of the foot part (5), a right foot side (41), a left foot side (42), a balancing spring (77) inserted in the ankle member housing (41.1) located in the ankle member (44), a swing storage spring-gear mechanism (D), an ankle lock mechanism (K), and heel springs (49). Here, the heel springs (49) are used to cushion the ground strike. The right foot side (41) and left foot side (42) are arranged in a hollow structure. This structure ensures that the prosthesis is greatly lightened and has an ergonomic structure. The ankle lock mechanism (K) is formed by an ankle shaft component (51), a first member of the ankle lock (52), a second member of the ankle lock (53), a third member of the ankle lock (54), a fourth member of the ankle lock (55), and a fifth member the ankle lock (56). When the fifth member of the ankle lock (56) touches the ground, the ankle shaft component (51) and the first member of the ankle lock (52) are engaged and the ankle joint is locked.

The dorsiflexion spring tube (57) containing the dorsiflexion spring (60) is connected to the front of the foot part (5) through the toe tip housings (83), and the piston rod (82) pressing the dorsiflexion spring tube (57) is connected to the ankle member (44) at the back of the foot. The dorsiflexion spring (60) stores energy during dorsiflexion of the ankle, which is generated about 10% and 45% of the stride.

The balancing spring (77) according to the present invention is configured to allow the foot to return to its normal position after the push-off. In an embodiment of the invention, it is positioned between the balancing spring (77) and the front of the foot and the ankle member (44). It may include another mechanical device or configuration that can be replaced with a structure that will allow the foot to return/reset to its normal position after the push-off.

In an embodiment of the device, the mechanism moving the swing storage spring (10), which is configured such that a near-natural energy generation can be achieved during push-off, is formed by the drive gear (63), the driven gear (72), the intermediate gear (76) and the gear rod (70). The drive gear (63) is configured to rotate with respect to the movement of the ankle. The drive gear (63) is coupled onto the left foot side (42). The intermediate gear (76) is configured to transfer the motion of the drive gear (63) to the driven gear (72). It is connected between the foot left side (42) and the driven gear (72) by means of a shaft (24). The driven gear (72) is configured to allow the gear rod (70) and the swing storage mechanism (1) attached thereto to move back and forth. The mechanism that moves the swing storage spring (10) may also be another mechanical device or configuration that can be replaced by a movable device such as a slider, bolt, pin, carriage, roller, or other sliding device. Thus, the swing storage mechanism (1) can be moved between at least two positions in the foot part (5) by being moved along a guided path.

The heel springs (49) provide shock absorption. In an embodiment of the invention, the heel springs (49) and the heel spring rod (48) are fixed to the foot part (5) at the lower end by means of the right heel spring holder (46) and the left heel spring holder (47). The movement of the heel springs (49) is limited by the heel spring rod (48). The heel springs (49) are fixed to the foot right and left sides (41, 42) at the upper end by means of the heel spring connector (50). Also, another mechanical device or configuration that provides shock absorption can be used.

This transfemoral prosthesis can store and release energy in both joints, namely the ankle and knee. The knee joint (4) stores energy during swing and transfers it to the ankle joint during pushing through the swing storage mechanism (1). The actuation mechanism for the swing storage spring (10) moves the swing storage mechanism (1) during pushing to naturally release the stored energy. After the push-off, the balancing spring (77) retracts the foot so that the ankle joint is 0 degrees. This provides safe ground clearance during swing and resets the foot to the starting position before the heel strikes. After the heel strike, the weight-receiving member (6) at the knee joint (4) stores and release energy at the same joint to ensure safe descending and efficient ankle roll-over. This weight-receiving member (6) is deactivated during swing and activated by the heel strike. The same spring stores energy during sitting and returns it back while standing up in order to provide energy-efficient sit-to-stands. The same spring is also used to store energy in parallel with a motor (81) during stair climbing in order to provide an energy efficient and lightweight solution to robotic prostheses.

The energy storage capacity of the swing storage mechanism (1) is increased and decreased in accordance with the ankle push-off variance, and in order to adapt to the knee angular velocity of the swing phase for different walking speeds. The moment arm of the weight-receiving spring is modified to increase and decrease the torque around the knee joint (4) in accordance with the different walking speeds. In an embodiment of the invention, the inertial sensor (75) is configured in the front part of the foot to measure the angular velocity of the foot in controlling the adaptive and robotic transfemoral prosthesis.

The weight-receiving member (6) and the swing storage mechanism (1) located in the lower leg (2) of the prosthesis are provided with motor (81) and microprocessor control, thus providing an active device that imitates the movement and energetic behavior of the human natural knee and ankle joints, which is simplified and non-bulky, and which stores and release energy during different phases of the natural gait cycle.

While described and illustrated by the above embodiments, it is understood that alternatives and modifications to these embodiments, such as those suggested by others, may be included in the scope of the specification. Furthermore, any of the principles described herein can be extended to other orthopedic devices, prosthetic devices, which require similar functions of the structural members described herein. For example, the use of the above elements is not limited to a transfemoral prosthetic device, but may also be used in a transtibial prosthetic device or similar lower leg (2) prosthetic device.

The present invention is a passive prosthesis that combines the knee and ankle with energy conversion suitable for the nature of walking, which provides a passive prosthesis device that reduces the excessive metabolic energy consumption and increases the normal walking speed of the user, by being optimized for walking, which constitutes 90% of the leg functions in daily life, and allowing other functions to be performed. It is also possible to provide an active device that stores and releases energy at different phases of the natural gait cycle by providing motor (81) and microprocessor control to the prosthesis, which is simplified and not bulky, and which imitates the movement and energetic behavior of the human natural knee and ankle joints.

What is claimed is:

1. A prosthesis or orthosis device comprising:
   a knee joint connectable with a leg of a user;
   a swing storage spring-gear mechanism comprising a balancing spring inserted in an ankle member housing located in an ankle member, a drive gear, a driven gear, an intermediate gear and a gear rod, and a foot part comprising a dorsiflexion spring, wherein the balancing spring is configured to prevent a foot from returning to 0 degrees with respect to a ground and striking the ground once again after a push-off;
   a lower leg connecting the knee joint and the foot part to each other, wherein a weight-receiving member is located in the lower leg,
   wherein the lower leg is connected to the knee joint, and the lower leg is connected to the foot part through the ankle member housing;
   a swing storage mechanism connected to the foot part by a second housing of a connection tube and a gear rod pin, and to the knee joint by a first housing of the connection tube and a first housing of the knee joint,
   wherein the swing storage mechanism comprises a swing adaptation mechanism consisted of nested connection member tubes and a connection member swing storage spring located in the nested connection member tubes, a spring cover, a guide screw and a brushless direct current (BLDC) motor,
   wherein the swing adaptation mechanism stores energy generated at different walking speeds,
   wherein a dorsiflexion spring tube containing the dorsiflexion spring is connected to the front of the foot part through a toe tip housings, and a piston rod pressing the dorsiflexion spring tube is connected to the ankle member at a back of a foot of the lea of the user,
   wherein the swing storage mechanism is configured to move in the foot part between at least two positions by the swing storage spring-gear mechanism; and
   a weight-receiving mechanism comprising the weight-receiving member and a compression arm and a lock fork for activating and deactivating the weight-receiving member,
   wherein the compression arm is connected to the knee joint through a compression spring housing, a knee joint third housing and a shaft, and to the weight-receiving member through a weight-receiving housing, wherein a lower end of the support arm is connected to the lower leg through lower leg housings and an upper end of the support arm is connected to the lock fork through a lock fork housing.

2. The prosthesis or orthosis device according to claim 1, wherein the weight-receiving member is a spring.

3. The prosthesis or orthosis device according to claim 2, further comprising a posture adaptation mechanism comprising a guide rail and a carrier connected to the compression arm, wherein the posture adaptation mechanism adjusts the compression arm in a knee axis by a movement of the carrier on the guide rail in accordance with a walking speed, in order to increase or decrease a torque formed around a knee of the leg of the user in accordance with the walking speed.

4. The prosthesis or orthosis device according to claim 2, further comprising an ankle lock mechanism comprising an ankle shaft gear configured to retain the ankle to be locked, a first member of an ankle lock, a second member of the ankle lock, a third member of the ankle lock, a fourth member of the ankle lock, and a fifth member of the ankle lock.

5. The prosthesis or orthosis device according to claim 2, wherein the weight-receiving mechanism is configured to allow 75°-110° flexion of a knee of the leg of the user while sitting, the weight-receiving mechanism presses the weight-receiving member and stores energy, and the weight-receiving mechanism resets the weight-receiving member while standing up, thereby providing sit-to-stand support.

6. The prosthesis or orthosis device according to claim 2, wherein heel springs configured to provide shock absorption are connected to the foot part at a lower end by a right heel spring holder and a left heel spring holder, and are connected to foot right and left sides at an upper end by a heel spring connector.

7. The prosthesis or orthosis device according to claim 2, further comprising a motor located at an end of the weight-receiving member and providing power.

8. The prosthesis or orthosis device according to claim 1, further comprising a posture adaptation mechanism comprising a guide rail and a carrier connected to the compression arm, wherein the posture adaptation mechanism adjusts the compression arm in a knee axis by a movement of the carrier on the guide rail in accordance with a walking speed, in order to increase or decrease a torque formed around a knee of the lea of the user in accordance with the walking speed.

9. The prosthesis or orthosis device according to claim 8, further comprising an ankle lock mechanism comprising an ankle shaft gear configured to retain the ankle to be locked, a first member of an ankle lock, a second member of the ankle lock, a third member of the ankle lock, a fourth member of the ankle lock, and a fifth member of the ankle lock.

10. The prosthesis or orthosis device according to claim 8, wherein the weight-receiving mechanism is configured to allow 75°-110° flexion of the knee of the leu of the user while sitting, the weight-receiving mechanism presses the weight-receiving member and stores energy, and the weight-receiving mechanism resets the weight-receiving member while standing up, thereby providing sit-to-stand support.

11. The prosthesis or orthosis device according to claim 8, wherein heel springs configured to provide shock absorption are connected to the foot part at a lower end by a right heel spring holder and a left heel spring holder, and are connected to foot right and left sides at an upper end by a heel spring connector.

12. The prosthesis or orthosis device according to claim 8, further comprising a motor located at an end of the weight-receiving member and providing power.

13. The prosthesis or orthosis device according to claim 1, further comprising an ankle lock mechanism comprising an ankle shaft gear configured to retain the ankle to be locked, a first member of an ankle lock, a second member of the ankle lock, a third member of the ankle lock, a fourth member of the ankle lock, and a fifth member of the ankle lock.

14. The prosthesis or orthosis device according to claim 13, wherein the weight-receiving mechanism is configured to allow 75°-110° flexion of a knee of the leg of the user while sitting, the weight-receiving mechanism presses the weight-receiving member and stores energy, and the weight-receiving mechanism resets the weight-receiving member while standing up, thereby providing sit-to-stand support.

15. The prosthesis or orthosis device according to claim 13, wherein heel springs configured to provide shock absorption are connected to the foot part at a lower end by a right heel spring holder and a left heel spring holder, and are connected to foot right and left sides at an upper end by a heel spring connector.

16. The prosthesis or orthosis device according to claim 1, wherein the weight-receiving mechanism is configured to allow 75°-110° flexion of a knee of the lea of the user while sitting, the weight-receiving mechanism presses the weight-receiving member and stores energy, and the weight-receiving mechanism resets the weight-receiving member while standing up, thereby providing sit-to-stand support.

17. The prosthesis or orthosis device according to claim 16, wherein heel springs configured to provide shock absorption are connected to the foot part at a lower end by a right heel spring holder and a left heel spring holder, and are connected to foot right and left sides at an upper end by a heel spring connector.

18. The prosthesis or orthosis device according to claim 1, wherein heel springs configured to provide shock absorption are connected to the foot part at a lower end by a right heel spring holder and a left heel spring holder, and are connected to foot right and left sides at an upper end by a heel spring connector.

19. The prosthesis or orthosis device according to claim 1, further comprising a motor located at an end of the weight-receiving member and providing power.

* * * * *